Figure 1:
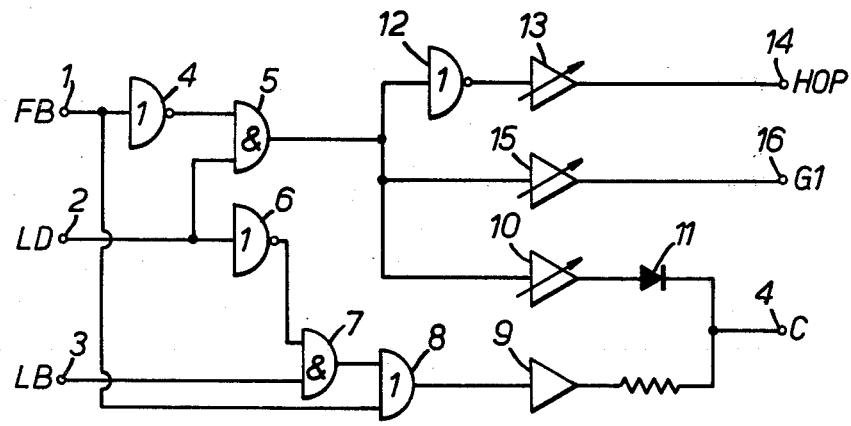

United States Patent [19]
Gibson et al.

[11] 4,143,305
[45] Mar. 6, 1979

[54] TELEVISION CAMERA TUBE ARRANGEMENTS

[75] Inventors: Ian E. Gibson, Maldon; Stephen T. Mansfield, Chelmsford, both of England

[73] Assignee: The Marconi Company Limited, Chelmsford, England

[21] Appl. No.: 763,621

[22] Filed: Jan. 28, 1977

[30] Foreign Application Priority Data

Feb. 24, 1976 [GB] United Kingdom ............... 7308/76

[51] Int. Cl.² .......................................... H01J 29/52
[52] U.S. Cl. .................................. 315/379; 358/223
[58] Field of Search ............... 315/369, 379, 384, 385; 358/160, 167, 223

[56] References Cited

U.S. PATENT DOCUMENTS 3,600,520  8/1971  Slark ................................... 358/223
3,955,116  5/1976  Van den berg ....................... 315/383

FOREIGN PATENT DOCUMENTS 1247647  9/1972  United Kingdom ................. 358/223
 400051  2/1974  U.S.S.R. ............................. 358/223

*Primary Examiner*—Theodore M. Blum
*Attorney, Agent, or Firm*—Diller, Ramik & Wight

[57] ABSTRACT

The invention relates to a camera tube arrangement utilizing a so-called H.O.P. (highlight overload protection) or A.C.T. (anti-comet tail) type of camera tube. In order to mitigate the problem of highlights appearing at the top of the picture, in addition to the beam being arranged to discharge overloads in the target area during line flyback, the beam is also arranged to operate in a highlight discharge mode for a predetermined number (for example one) of scanning lines after field flyback but before the end of field system blanking.

14 Claims, 5 Drawing Figures

TELEVISION CAMERA TUBE ARRANGEMENTS

This invention relates to television camera tube arrangements.

In a typical photoconductive television camera tube arrangement as at present known, an optical image is projected on to the photoconductive target of the tube, causing the target to become conductive. The signal side of the target is connected through a high impedance to a positive potential. When the target becomes conductive the potential of the rear of each target element rises towards the positive potential in proportion to the light falling on the target element. A beam of electrons scans the rear of the target discharging the target elements in turn. Since the electrons are accelerated from near rest at the cathode potential, typically zero volts, the electrons will land on a particular target element and discharge it to approximately cathode potential after which no further electrons will land on the element until the next scan.

The action of discharging produces a signal current in the signal electrode that is proportional to the light falling on the target element being scanned. The electron beam is normally arranged to be capable of discharging an overload signal that is twice the peak white signal. If a larger overload is present the beam is unable to discharge the target element completely during one scan, so the mean potential of the target element rises towards the potential of the signal side of the target. This abnormally high potential deflects the electron beam towards the positive overload when the beam is scanning elements adjacent to the overload. This is called beam pulling and increases the apparent size of the area of the overload. The increase in size is called blooming.

If the position of the overload moves across the target, due to movement of the camera or of the bright object being viewed, the beam is unable to discharge the target elements immediately after the overload has moved to another part of the target. It may take several scans to completely discharge the target elements and this results in a white tail following the moving bright image, called a comet tail.

An H.O.P. (Highlight Overload Protection) or A.C.T. (Anti Comet Tail) type of camera tube uses an entirely different electrode structure to a normal (non H.O.P.) tube. In an H.O.P. or A.C.T. tube the beam is focused inside the gun assembly forming a beam crossover where the cross sectional area of the beam is very small. After the crossover, the beam is divergent and only a small part of the beam passes through a hole in the centre of the final electrode of the gun.

An image of the crossover is formed on the target by a combination of magnetic and electrostatic focusing and this image is scanned across the target by magnetic scanning. Any combination of magnetic and/or electrostatic focusing and magnetic and/or electrostatic scanning may also be used. The scan of the displayed picture is, by convention, from left to right at a relatively high frequency (typically 15kHz) to form horizontal lines, and from top to bottom at a relatively low frequency (typically 50Hz) to form a field. It is usual though not necessary to displace alternate fields vertically by half a line. This is called interlace and two consecutive fields form a frame. At the end of each line it is necessary to move the beam back to the start of the next line. This is called flyback and typically takes place in 10% of the line period. During flyback it is necessary to prevent the beam from discharging the image on the target and this can be achieved by applying a positive potential to the cathode so the electrons are no longer able to land on the target. This is called line target blanking (or beam blanking), and is normally extended to include part of the scan either side of flyback. Similarly field target blanking is applied during and either side of field flyback, and this may extend for several lines into the new field. (Target blanking can also be achieved by making the tube control grid more negative to cut off the beam). In an H.O.P. or A.C.T. tube the potential that the cathode is raised to during line flyback is only slightly higher than the target potential that corresponds to peak white (or peak colour if a colour tube). The flyback beam does not land on any part of the useful image for a small overload. However, if a large overload is present the potential on the target rises above the cathode potential and the beam lands during flyback discharging the target to approximately the same potential as the cathode.

The current involved in discharging a highlight during flyback can be much larger than the normal signal current.

Firstly the line flyback period is typically 10% of the line period, and since the flyback velocity is therefore about ten times the forward scanning velocity there is a corresponding increase by ten times in signal current. Secondly, the overload that an H.O.P. or A.C.T. tube is claimed to cope with may be twenty or thirty times peak white. The combined effect of these two factors gives possible flyback signal currents of two hundred to three hundred times the normal signal current during H.O.P. operation. The beam current available during flyback is increased by altering the focus in the gun assembly to produce a crossover at or near the centre of the exit hole in the final electrode of the gun, thereby allowing most of the electrons through the hole. Since the final crossover in the gun has been moved forward the magnetic focus no longer focuses the beam to a fine spot at the target. The diameter of the beam as it approaches the target covers many scanning lines, so the partial discharge of the highlights occurs a number of lines ahead of the normal forward scan. Blooming is therefore reduced to the same level as that associated with a small overload. During the forward scan the beam is able to discharge the residual overload so comet tailing does not occur.

Where a large overload occurs towards the centre of the picture area, known H.O.P. or A.C.T. tube arrangements as described above are satisfactory. As already mentioned the defocused beam during flyback partly discharges the overload several lines ahead of the normal scan. The remainder of the defocused beam does not land (except for the small current required to discharge the rise in potential between successive flybacks).

However, if a large area overload occurs at the top of the picture area then during the first line flyback after field target blanking the defocused beam enters the large area overload that has not been partly discharged by previous lines. The whole of the beam lands instead of just the vertical leading edge, resulting in a much larger signal current than the same overload produces in the centre of the picture. This means that a much larger beam current is required to discharge the overload to cathode potential at the top of the picture.

Thus with the known H.O.P. or A.C.T. tube arrangement two defects may be observed. Firstly there is a considerable increase in flyback signal current when a highlight moves to the top of the picture. This may produce overload effects in the amplifier connected to the target (normally called the head amplifier) when the highlight occurs at the top of the picture, even though no such amplifier overload effects occur when the same highlight occurs in any other part of the picture. Secondly there is a tendency for blooming and comet tailing to occur at the top of the picture since a greater beam current is required to discharge highlights than is required in the remainder of the picture.

The present invention seeks to provide an improved H.O.P. or A.C.T. tube arrangement in which the above defects are mitigated.

According to this invention, an H.O.P. or A.C.T. television camera tube arrangement is provided wherein in addition to the beam being arranged to discharge overloads in the target area during line flyback, additional means are provided for discharging overloads in that part of the target scanned by a predetermined number of scanning lines after field flyback.

Said predetermined number of scanning lines after field flyback may be a single scanning line.

Preferably said additional means comprises means for causing said beam to operate in a highlight discharge mode for said predetermined number of scanning lines after field flyback, but before the end of field system blanking and the operation of said beam to discharge overloads during line flyback is arranged to commence after, and preferably immediately after, said predetermined number of lines.

The present invention is applicable both to monochrome and colour television camera arrangements.

Figure 3:
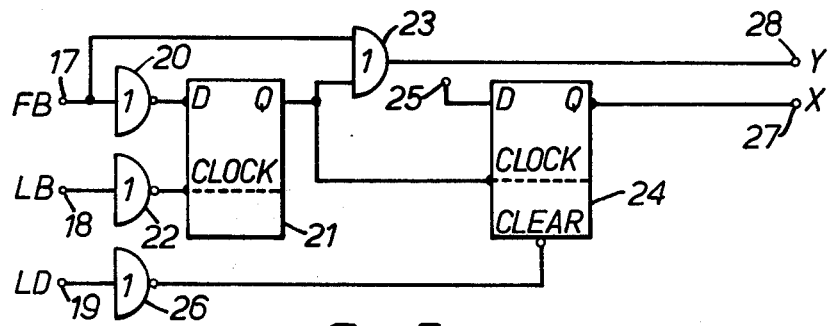
Figure 4:
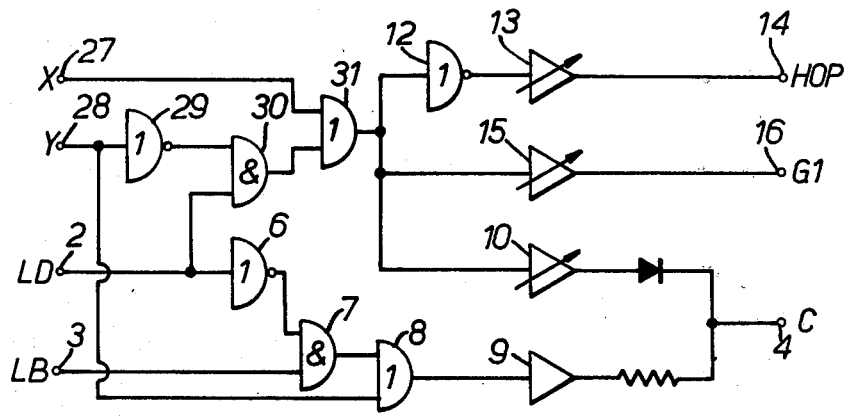
Figure 2:
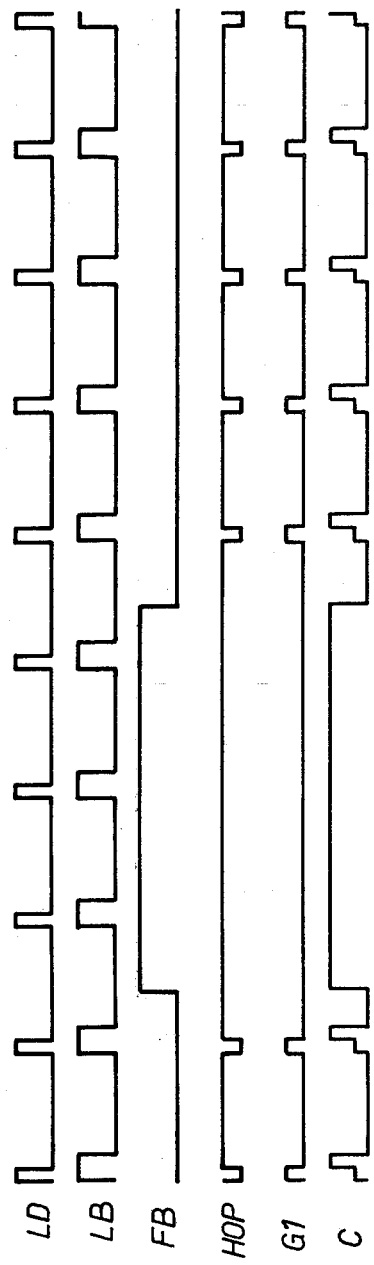
Figure 5:
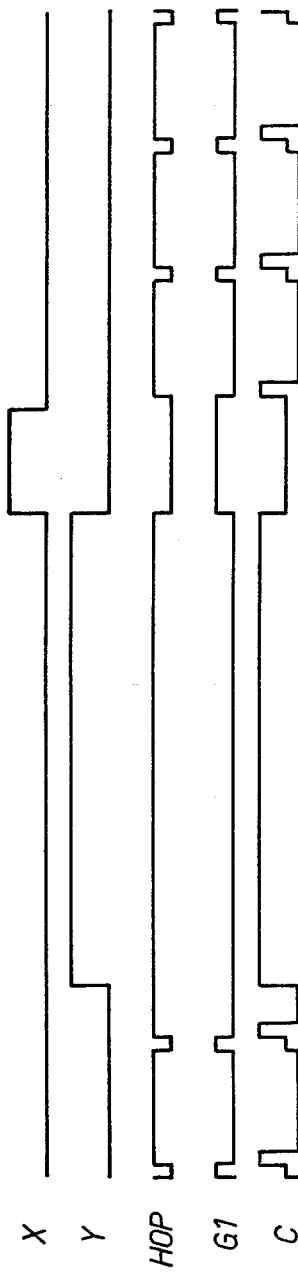

The invention is further described with reference to the accompanying drawings in which, FIG. 1 is a block schematic diagram of a known H.O.P. television camera tube arrangement, FIG. 2 is a graphical diagram illustrating the different waveforms at different points in the diagram of FIG. 1, FIGS. 3 and 4 are block schematic diagrams illustrating the present invention, and FIG. 5 is a graphical diagram showing waveforms at different points in the diagrams of FIGS. 3 and 4.

It will be noted that the waveforms of FIGS. 2 and 5 are arranged one above the other and to the same time scale so that these may be compared.

Referring to FIG. 1, three input terminals 1, 2 and 3 are provided. Input terminal 1 is provided to have applied thereto field target blanking pulses as shown at FB in FIG. 2. Input terminal 2 is arranged to have applied thereto line drive pulses as represented at LD in FIG. 2. Input terminal 3 is arranged to have applied thereto line target blanking pulses as represented at LB in FIG. 2. The waveforms FB, LD and LB are, of course, available from elsewhere in the system (not shown).

Input termination 1 is connected via an inverter 4 to one input terminal of an AND gate 5. A second input terminal of AND gate 5 derives an input from input terminal 2, which last mentioned terminal is also connected via an inverter 6 to one input terminal of an AND gate 7. A second input terminal for AND gate 7 is connected to input terminal 3. The output of AND gate 7 is connected to one input of an OR gate 8, a second input for which is derived from the terminal 1.

The output of OR gate 8 is applied via an amplifier 9 to an output terminal 4. The output terminal of AND gate 5 is also connected to output terminal 4 but via a variable gain amplifier 10 and a rectifier 11. The output terminal of AND gate 5 is also connected via an inverter 12 and a variable gain amplifier 13 to an output terminal 14 and via a variable gain amplifier 15 to an output terminal 16.

Output terminal 4 is connected to the cathode of the H.O.P. camera tube (not shown), whilst output terminal 16 is connected to the control grid (G1) of the tube and output terminal 14 is connected to the H.O.P. electrode of the tube.

The waveforms appearing at terminals 14, 16 and 4 are represented respectively at H.O.P., G1 and C in FIG. 2.

In the operation of this conventional arrangement, the H.O.P. electrode potential is decreased and the control grid and cathode potentials are increased during line flyback, except during field blanking. After line flyback, the cathode potential is raised to a normal (i.e. non H.O.P.) target blanking potential for the remainder of line blanking. The cathode potential is also raised to the normal target blanking potential throughout the field blanking.

An arrangement in accordance with the present invention will now be described with reference to FIGS. 3 to 5.

Firstly, the waveforms X and Y, as represented in FIG. 5 are generated by means of the circuit arrangement schematically represented in FIG. 3.

Referring to FIG. 3, three input terminals 17, 18 and 19 are provided. Input terminal 17 is arranged to have applied thereto field target blanking pulses as represented at FB in FIG. 2. Input terminal 18 is arranged to have line target blanking pulses applied thereto, as represented at LB in FIG. 2. Input terminal 19 is arranged to have line drive pulses applied thereto as represented at LD in FIG. 2. As with the known arrangement of FIG. 1, the waveforms FB, LB and LD are derived from elsewhere in the system, which is as known per se. Input terminal 17 is connected via an inverter 20 to the "D" input terminal of a D type flip-flop circuit 21. Input terminal 18 is connected via an inverter 22 to the clock input terminal of flip-flop circuit 21. Input terminal 17 is also connected to one input terminal of an OR gate 23, a second input terminal of which is connected to the "Q" output terminal of flip-flop circuit 21.

The "Q" output terminal of flip-flop circuit 21 is also connected to the "clock" input terminal of a further D type flip-flop circuit 24. The "D" input terminal of flip-flop circuit 24 is connected to a source 25 of "logic high" potential. The "clear" input terminal of flip-flop circuit 24 (which clears with a "logic low" input to its clear terminal) derives an input via an inverter 26 from input terminal 19. The "Q" output terminal of flip-flop circuit 24 is connected to an output terminal 27, whilst the output of OR gate 23 is connected to an output terminal 28.

In operation, the waveform X as represented in FIG. 5 will appear at output terminal 27, whilst the waveform represented at Y in FIG. 5 will appear at output terminal 28. The positive going pulses in waveform X corresponds to the first complete line after field blanking, excluding the line blanking interval. During this line the output electrode potentials are made the same as those during line flyback, so the H.O.P. action takes place during the forward scan. Because this last-mentioned scan is about ten times slower than during line flyback, there is a corresponding reduction in the beam current required to discharge a highlight. Field blanking is extended to produce the waveform Y, where the trailing edge coincides with the leading edge of the pulse in waveform X. This ensures that no H.O.P. action occurs at the start of the field before the one line of forward scan H.O.P.

The waveforms Y and X are combined with the waveforms LD and LB as shown in FIG. 4, in which like references are used for like parts in FIGS. 1 and 3.

Referring to FIG. 4, it will be seen that output terminal 28 is connected via an inverter 29 to one input terminal of an AND gate 30, a second input for which is derived from line drive input terminal 2. The output terminal of AND gate 30 is connected to one input terminal of an OR gate 31, a second input terminal of which is connected to X waveform terminal 27. The output terminal of OR gate 31 is connected to inverter 12 and variable gain amplifiers 15 and 10 in the manner in which the output terminal of AND gate 5 in FIG. 1 is connected to the corresponding components in that Figure. The input for amplifier 9 is derived from line drive input terminal 2 and line target blanking input terminal 3 in a manner similar to that already described with reference to FIG. 1, except that instead of OR gate 8 deriving one input consisting of field blanking pulses FB (applied to terminal 1 in FIG. 1), the corresponding input in FIG. 4 is derived from Y waveform terminal 28.

The modified nature of the H.O.P., G1 and C waveforms appearing at terminals 14, 16 and 4 respectively in FIG. 4, are as represented in FIG. 5.

We claim:

1. An H.O.P. or A.C.T. television camera tube arrangement wherein in addition to the beam being arranged to discharge overloads in the target area during line flyback, additional means are provided for discharge overloads only in that part of the target scanned by a predetermined number of scanning lines immediately after field flyback.

2. An arrangement as claimed in claim 1 and wherein said predetermined number of scanning lines after field flyback is a single line.

3. An arrangement as claimed in claim 2 and wherein said additional means comprises means for causing said beam to operate in a highlight discharge mode for said predetermined number of scanning lines after field flyback, but before the end of field system blanking and the operation of said beam to discharge overloads during line flyback is arranged to commence after said predetermined number of lines.

4. An arrangement as claimed in claim 3 and wherein said additional means comprises means for causing said beam to operate in a highlight discharge mode for said predetermined number of scanning lines after field flyback, but before the end of field system blanking and the operation of said beam to discharge overloads during line flyback is arranged to commence immediately after said predetermined number of lines.

5. In a H.O.P. or A.C.T. television camera tube arrangement including control means for causing electron beams defocussing such that the diameter of the beam covers many scanning lines at the target and for raising cathode potential to a value slightly higher than target potential corresponding to that selected peak value at which a single forward line scan of the beam is effective to reduce the target potential substantially to cathode potential, means for actuating said control means during periods of line flyback whereby to limit target potential in areas of successive scanning in the field substantially to said selected peak value, and means for effecting field blanking to overlap the beginning of each field period, the improvement which comprises:

additional means for actuating said control means during forward line scan only at the beginning of each field period.

6. In a television camera tube arrangement as defined in claim 5 wherein said additional means actuates said control means only during forward line scan.

7. In an H.O.P. or A.C.T. television camera tube arrangement wherein forward line scanning is effective to reduce target poetntial substantially to cathode potential so long as target potential does not exceed a particular peak value, and including means for increasing the intensity of the scanning beam during line flyback periods whereby to limit the target potential in successive lines substantially to said particular peak value, and means for effecting field blanking to overlap at least one line of each successive field, the improvement which comprises:

additional means operative only during the field blanking overlap of each field period for limiting target potential, at initial lines of each field immediately following such field blanking and which are not overlapped thereby, substantially to said particular peak value.

8. In a television camera tube arrangement as defined in claim 7 wherein said at least one line of each field is the last line overlapped by field blanking and said additional means is operative only during said at least one line.

9. In a television camera tube arrangement as defined in claim 8 wherein said additional means is operative only during forward line scan.

10. In a television camera tube arrangement as defined in claim 7 wherein said additional means is operative only during forward line scan.

11. A television camera tube arrangement as defined in claim 1 wherein said additional means is operative only during forward line scan.

12. A television camera tube arrangement as defined in claim 2 wherein said additional means is operative only during forward scan of said single line.

13. A television camera tube arrangement as defined in claim 3 wherein said additional means is operative only during forward scan of said single line.

14. A television camera tube arrangement as defined in claim 4 wherein said additional means is operative only during forward scan of said single line.

* * * * *